US008475861B2

(12) United States Patent
Meunier

(10) Patent No.: US 8,475,861 B2
(45) Date of Patent: Jul. 2, 2013

(54) PROCESS AND INSTALLATION FOR MAKING A RESTRUCTURED MEAT ARTICLE, DEVICE FOR COMPACTING MEAT FRAGMENTS AND DEVICE FOR COMPRESSING AN UNFINISHED MEAT ARTICLE

(75) Inventor: Jean Meunier, Bellerive-sur-Allier (FR)

(73) Assignee: Convivial, Creuzier le Vieux (FR)

( * ) Notice: Subject to any disclaimer, the term of this patent is extended or adjusted under 35 U.S.C. 154(b) by 1136 days.

(21) Appl. No.: 12/161,997

(22) PCT Filed: Jan. 29, 2007

(86) PCT No.: PCT/FR2007/050704
§ 371 (c)(1),
(2), (4) Date: Feb. 18, 2009

(87) PCT Pub. No.: WO2007/085773
PCT Pub. Date: Aug. 2, 2007

(65) Prior Publication Data
US 2009/0220660 A1 Sep. 3, 2009

(30) Foreign Application Priority Data
Jan. 30, 2006 (FR) .................................... 06 00842

(51) Int. Cl.
A22C 7/00 (2006.01)
B29C 43/08 (2006.01)
B29C 43/36 (2006.01)

(52) U.S. Cl.
USPC ........ 426/512; 426/513; 425/348 R; 425/345; 425/412; 425/423

(58) Field of Classification Search
USPC ...... 426/512, 513; 425/348 R, 345, 352–355, 425/412, 423
See application file for complete search history.

(56) References Cited

U.S. PATENT DOCUMENTS

| | | | | |
|---|---|---|---|---|
| 2,708,287 A | * | 5/1955 | Long et al. | 425/556 |
| 3,504,639 A | * | 4/1970 | Benjamin | 425/357 |
| 3,851,355 A | * | 12/1974 | Hughes | 425/556 |

(Continued)

FOREIGN PATENT DOCUMENTS

| | | |
|---|---|---|
| EP | 0024274 A | 3/1981 |
| FR | 2365961 A | 4/1978 |
| FR | 2609869 A | 7/1988 |
| FR | 2781337 A | 1/2000 |
| FR | 2826237 A1 | 12/2002 |
| JP | 2001038681 A | 2/2001 |
| WO | 8505538 A | 12/1985 |

Primary Examiner — Richard Crispino
Assistant Examiner — Thukhanh Nguyen
(74) Attorney, Agent, or Firm — Jacox, Meckstroth & Jenkins

(57) ABSTRACT

In the process, at least one piece of meat is destructured by fragmenting it, and the meat fragments are transformed into a restructured meat article. The fragments are transformed into a restructured meat article by: forming a block of meat fragments by cohesive compaction of the meat fragments; removing at least a portion of the block, termed a preform; and compressing the preform between complementary surfaces for molding the preform. The meat fragment compacting device comprises two conveyor belts for cohesive compaction of the meat fragments, the belts converging from upstream to downstream relative to a direction of movement of the meat fragments. The device for compressing a preform for a meat article comprises pistons having surfaces for molding the preform, which surfaces vary from one piston to another.

30 Claims, 4 Drawing Sheets

U.S. PATENT DOCUMENTS

| | | | |
|---|---|---|---|
| 4,138,768 A * | 2/1979 | Roth | 425/307 |
| 4,460,611 A | 7/1984 | Suzuki | |
| 4,548,571 A | 10/1985 | Suzuki | |
| 4,552,523 A | 11/1985 | Suzuki | |
| 5,017,393 A | 5/1991 | Fradin | |
| 2003/0008607 A1 | 1/2003 | Long | |
| 2004/0155129 A1 | 8/2004 | Le Paih | |
| 2004/0211323 A1 | 10/2004 | Heinzen | |

* cited by examiner

US 8,475,861 B2

PROCESS AND INSTALLATION FOR MAKING A RESTRUCTURED MEAT ARTICLE, DEVICE FOR COMPACTING MEAT FRAGMENTS AND DEVICE FOR COMPRESSING AN UNFINISHED MEAT ARTICLE

CROSS-REFERENCE TO RELATED APPLICATIONS

This application is the U.S. National Phase application of PCT/FR2007/050704 filed Jan. 29, 2007, which claims priority to French Application No. 0600842 filed Jan. 30, 2006, which applications are incorporated herein by reference and made a part hereof.

BACKGROUND OF THE INVENTION

1. Field of the Invention

The present invention relates to a process and to plant for producing a restructured meat article, to a device for compacting meat fragments, and to a device for compressing a preform for a meat article.

2. Description of Related Art

A prior art process for producing a restructured meat article is already known; it is of the type comprising:

destructuring at least one piece of meat by fragmenting it; and transforming the meat fragments into a restructured meat article.

In general, a restructured piece of meat should, as far as possible, retain properties regarding mastication by a consumer that are similar to those of a piece of meat that has not been destructured.

This is primarily achieved by retaining, as far as possible, the structure of the meat's lipocytes and myofibrils, which have a diameter that is generally less than 50 micrometers.

Normally, the meat fragments are obtained by chopping or cutting the initial piece of meat into shreds of varying thickness.

In the prior art, proposals have already been made for transforming meat fragments into a restructured meat article by using endless screw or pusher blade extrusion means. Generally, the restructured meat article obtained has a generally cylindrical shape.

However, it has been observed that the mechanical stresses to which the meat fragments are subjected in conventional extrusion means damage the structure of the lipocytes and myofibrils in the meat and denature the organoleptic characteristics perceived during mastication by someone consuming the restructured meat (raw or cooked).

SUMMARY OF THE INVENTION

The primary aim of the invention is to optimize preservation of the structure of the lipocytes and myofibrils in the meat and, more generally, to better control the rheology of the meat during transformation of the meat fragments into a restructured meat article.

To this end, the invention provides a process of the above-mentioned type for producing a restructured meat article, the process being characterized in the fragments are transformed into a restructured meat article by:

forming a block of meat fragments by cohesive compaction of the meat fragments;

removing at least a portion of the block, termed a preform; and compressing the preform between complementary preform molding surfaces.

Cohesive compaction of the meat fragments produces a preform. Compression of the preform between the complementary molding surfaces allows the rheology to be properly controlled since the compressive pressure and the shapes of the complementary molding surfaces can be accurately controlled. This means that the cell structure of the meat, and more particularly the structure of the lipocytes and the myofibrils in the meat, can be preserved effectively.

Thus, the restructured meat article obtained by the process of the invention has a texture that is close to that of the initial piece of meat before destructuring.

Furthermore, the restructured meat article obtained by the process of the invention can easily be cut up into portions with regular characteristics (dimensions, weight, etc).

Other optional characteristics of this process are as follows:

the block of compacted meat fragments is formed continuously, the preform being constituted by a section of the continuous block;

the preform is compressed during the course of at least two successive steps of compression between complementary surfaces for molding the preform, which steps vary from one step to the other;

the preform is compressed during four successive steps of compression between complementary surfaces for molding the preform, which steps vary from one step to another;

each compression step lasts 20 seconds to 120 seconds, the compressive pressure applied during each of said steps being in the range 4 bar to 15 bar;

following compression of the preform:

the compressed restructured meat article is placed in a flexible envelope, preferably formed from plastic, under vacuum;

the envelope is sealingly closed;

the closed envelope and its contents are subjected to atmospheric pressure for a period termed the exudation period; and the contents are removed from the envelope; and the exudation period is approximately one hour.

The invention also provides a device for compacting meat fragments, the device being characterized in that it comprises two conveyor belts for cohesive compaction of the meat fragments, the belts converging from upstream to downstream relative to a direction of movement of the meat fragments between the compacting conveyors.

Other optional characteristics of said device for compacting meat fragments are as follows:

the two compacting conveyors are disposed one above the other such that the lower conveyor carries the meat fragments;

the two compacting conveyors form an angle between them that is in the range 10° to 30°.

The invention also provides a device for compressing a preform for a restructured meat article, the device being characterized in that it comprises:

at least one pressing anvil and at least two pressing pistons, each piston being complementary to the anvil so as to define a preform compression station between said anvil and the complementary piston; and means for pressing each piston and the anvil towards each other to compress the preform between said piston and anvil, each piston having a surface for molding the preform, which surface varies from one piston to another.

Other optional characteristics of said device for compressing a preform for a restructured meat article are as follows:

the device comprises two portions that are movable relative to each other, respectively carrying the anvil and the pistons;

the two portions that are movable relative to each other are formed by a stationary portion at least partially surrounding a movable portion forming a carousel;

the anvil and the pistons include complementary molding surfaces comprising elementary surfaces, each in the general form of an angular segment of a cylinder section;

each anvil or piston has a molding surface selected from:

a first molding surface comprising two elementary surfaces that meet longitudinally, with axes that converge in the direction opposite to the preform compression station;

a second molding surface comprising two elementary surfaces that meet longitudinally, with axes that converge in the direction towards the preform compression station;

a third molding surface comprising four elementary surfaces that meet longitudinally, the first two elementary surfaces, considered longitudinally, having axes that converge in the direction towards the preform compression station, and the last two elementary surfaces, considered longitudinally, also having axes that converge in the direction towards the preform compression station; and a fourth molding surface comprising an elementary surface with an axis substantially parallel to the preform compression station;

the device comprises first to fourth pistons having molding surfaces respectively formed by the first to the fourth molding surfaces, intended to cooperate in succession with one and the same preform placed in the anvil;

the anvil has a molding surface formed by the fourth molding surface;

the device includes a plurality of anvils, each piston being intended to cooperate with one and the same preform placed in one and the same anvil;

the pressing means include, for each piston, at least one pneumatic cylinder, for example three cylinders, connected to the piston.

The invention also provides plant for producing a restructured meat article, the plant being of the type comprising:

means for forming meat fragments; and means for transforming said fragments into a restructured meat article;

the plant being characterized in that the transformation means comprise:

means for cohesive compaction of the meat fragments to form a block of compacted meat fragments;

means for removing at least a portion of said block, termed the preform, from the restructured meat article; and means for compressing the preform between complementary surfaces for molding the preform.

The means of this plant ensure that manual intervention during production of a restructured meat article is limited, thus keeping hygiene risks under control.

Other optional characteristics of this plant are as follows:

the removal means comprise block-slicing means of the guillotine type;

the plant includes means for forming the preform, preferably forming a die of substantially rectangular section, the slicing means being disposed at the entrance to the means for forming the preform;

downstream of the means for compressing the preform, the plant includes means for weighing the preform;

the means for cohesive compaction of the meat fragments include a compacting device as defined above;

the means for compressing the preform include a compression device as defined above.

The invention can be better understood from the following description that is provided solely by way of example and made with reference to the accompanying drawings and appended claims.

DETAILED DESCRIPTION OF THE DRAWINGS

Figure 1:
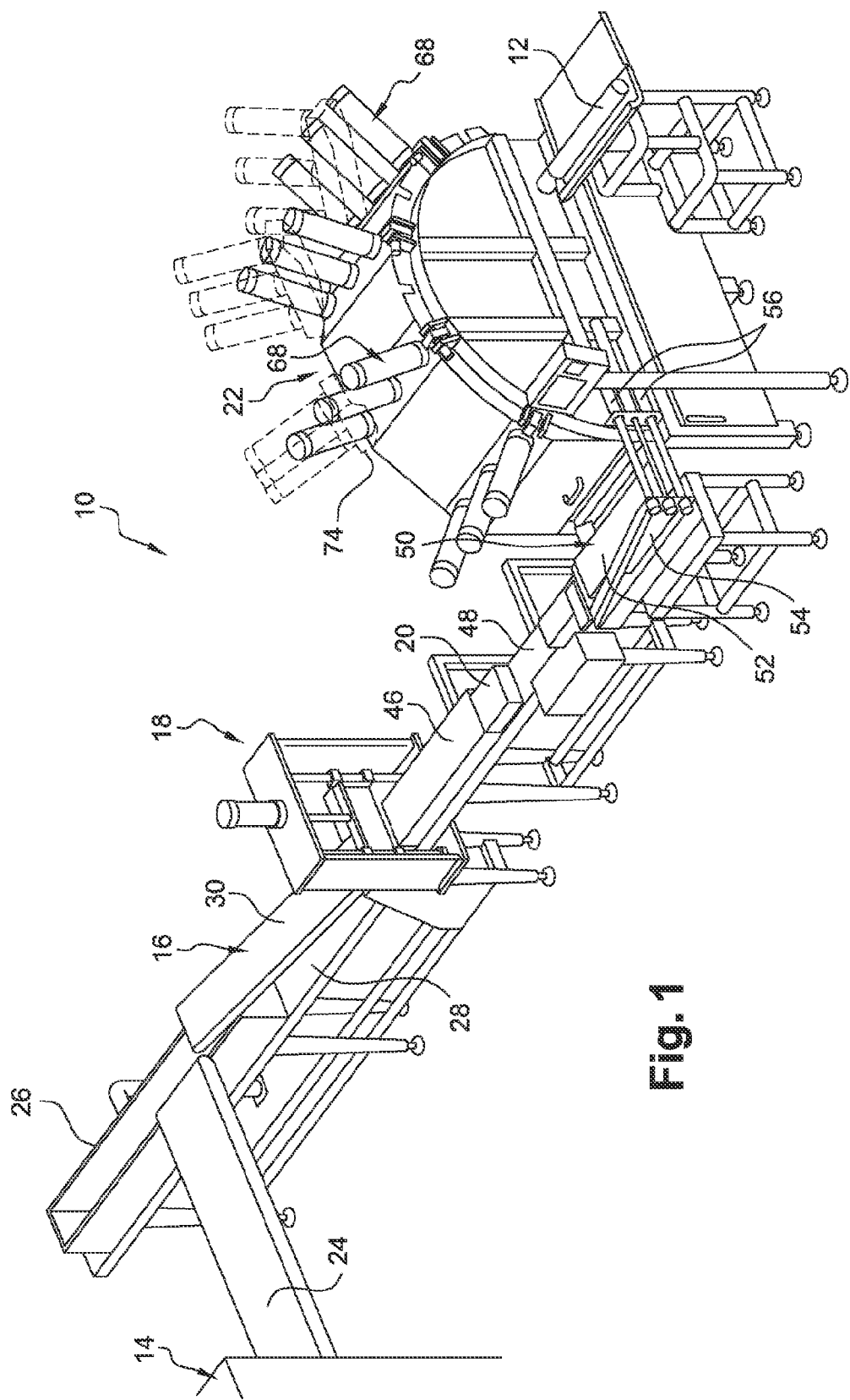
FIG. 1 is a perspective view of plant for producing a restructured meat article in accordance with the invention.

FIG. 1 shows a plant for producing a restructured meat article in accordance with the invention, denoted by the general reference 10.

This plant 10 includes various means that are described below, constituting a pathway for moving meat from an upstream end (on the left in FIG. 1) where fragments of destructured meat are produced, to a downstream end (on the right of FIG. 1) where the restructured meat articles 12 are recovered.

In the example described, the restructured meat articles are of generally cylindrical shape. Clearly, the base of the generally cylindrical shape is not necessarily circular and may in particular be egg-shaped.

The plant 10 comprises, from upstream to downstream, means 14 for forming meat fragments and means for transforming said fragments into restructured meat articles. These transformation means comprise means 16 for cohesive compaction of the meat fragments to form a block of compacted meat fragments, means 18 for removing at least a portion from said block, which portion is termed the meat article preform 20, and means 22 for compressing the preform 20.

The means 14 for forming meat fragments are conventional in type and include means that are known per se for cooling and slicing pieces of meat obtained by cutting up animals.

In the example shown, the means 14 form meat fragments (not shown) wherein each fragment has the general form of a shred with a surface area in the range 5 cm² [square centimeter] to 10 cm² and a thickness in the range 3 tenths to 9 tenths of a millimeter.

The meat fragments are transported downstream along the plant 10 using conventional means that, for example, include a first transfer conveyor or conveyor belt 24. The conveyor belt 24 extends from the means 14 to an upper opening in a receptacle 26 into which the meat fragments fall under gravity.

The means 16 for cohesive compaction of the meat fragments are formed by a device 16 comprising two conveyor belts or conveyors 28 and 30 for cohesive compaction of the meat fragments. The two compacting conveyor belts 28, 30 are disposed one above the other such that the lower conveyor 28 extends substantially horizontally and the upper conveyor 30 is inclined relative to the lower conveyor 28.

It should be noted that the lower conveyor 28 forms the bottom of the receptacle 26 and carries the meat fragments in a manner that transports them from said receptacle 26 to a space located between the two compacting conveyor belts. The two compacting conveyor belts 28, 30 converge in an upstream to downstream direction relative to the direction in which the meat fragments pass between said conveyors 28, 30 to cause cohesive compaction of the meat fragments.

Preferably, the two compacting conveyors 28, 30 form an angle between them in the range 10° to 30°, for example 20°.

Figure 2:
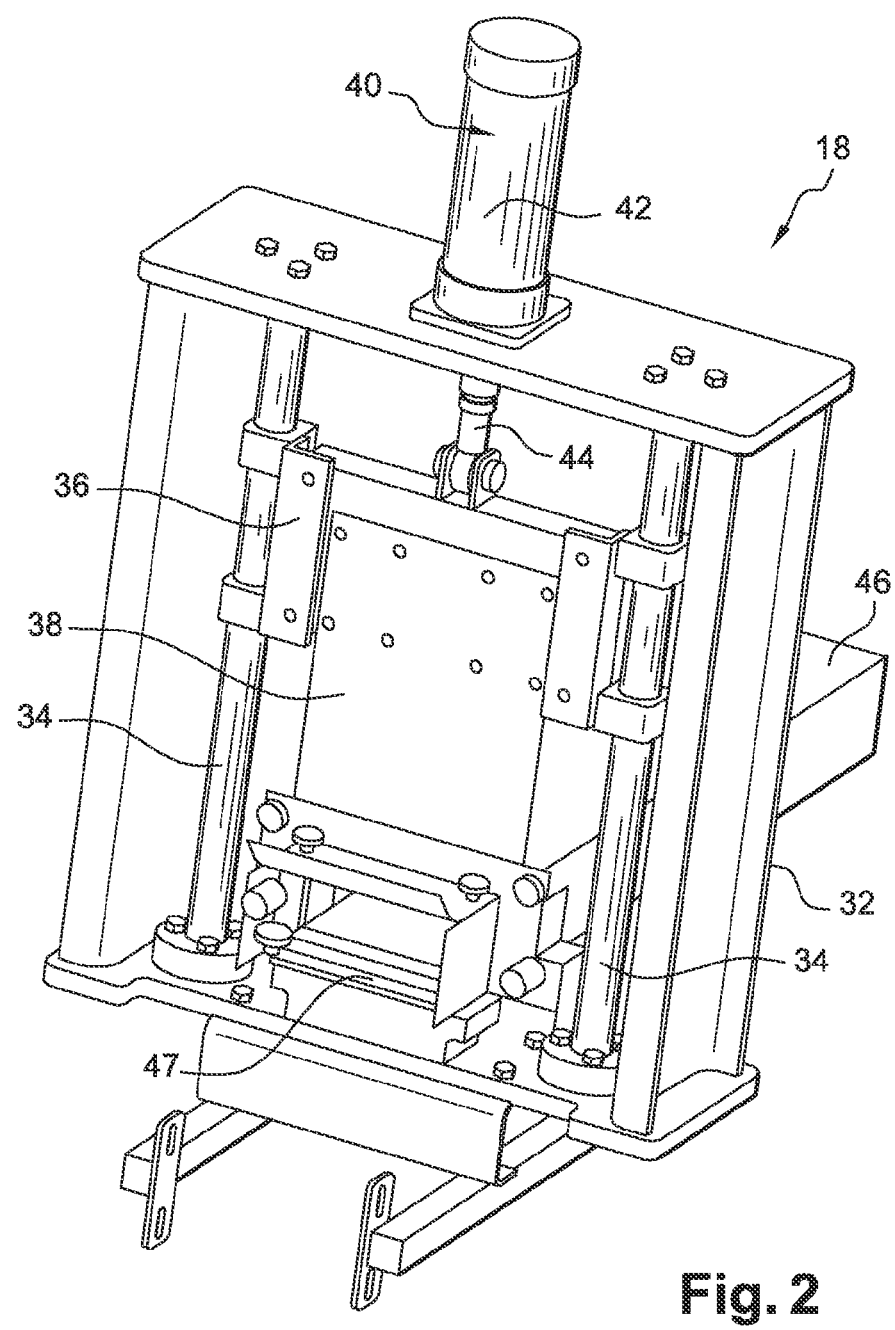
FIG. 2 is a perspective view of slicing means in the plant shown in FIG. 1.

The means 18 for removing the preform 20 are formed by means 18 for slicing the block of compacted meat fragments, shown in more detail in FIG. 2.

The slicing means 18 are of the guillotine type and comprise a stationary frame 32 provided with two vertical uprights 34 on which a blade carrier 36 can slide, with a slicing blade 38 fixed to the blade carrier.

The blade carrier 36 is driven using conventional means that, for example, include a hydraulic cylinder 40 provided with a body 42 that is fastened to the frame 32 and a rod 44 connected to the blade carrier 36.

The blade 38 is capable of being pushed partially into a through strike plate 47 that is secured to the frame 32 in order to assist in cutting the compacted meat fragment block cleanly.

The slicing means 18 are disposed at the entrance to the means 46 for forming the preform 20. This preform 20 is displaced through the forming means 46 using conventional means that, for example, comprise a second, substantially horizontal, transfer conveyor belt 48.

It should thus be noted that the lower compacting conveyor belt 28 constitutes the pathway for moving the compacted meat fragments to the slicing means 18; beyond the slicing means 18, the pathway for motion of the preform 20 is constituted by the second transfer conveyor belt 48.

Between the two conveyor belts 28 and 48, the meat pathway is continued by the plate 47 defining a surface on which the meat can slide and, if appropriate, by rollers interposed between this plate 47 and the second transfer conveyor belt 48.

The means 46 for forming the preform 20 preferably include a tunnel forming a die with a substantially rectangular section intended in particular to make the height of the preform 20 uniform.

At the outlet from the forming means 46, in the example described, the preform 20 is approximately 60 cm long, with a height of approximately 8.5 cm and a width of approximately 12 cm. Clearly, the dimensions of the preform may vary as a function of the final product that is to be obtained, in particular as a function of the weight of the final product that is to be obtained. In the example described, the length and height of the preform 20 are dictated by the dimensions of certain elements of the compression means 22 that are described below. In contrast, the width of the preform 20 may be modified as a function of the weight of the final product that is to be obtained. This width may, for example, be reduced to 8.5 cm. The dimensions of the tunnel forming the die (forming means 46) are then modified as a consequence.

The second transfer conveyor belt 48 transports the preform 20 to means 50 for weighing said preform.

The weighing means 50, disposed upstream of the means 22 for compressing the preform 20, comprise a weighing plate 52 and a push rod 54 intended to move the preform 20 from the weighing plate to the compression means 22.

The push rod 54 is actuated using conventional means that, for example, comprise a pair of pneumatic cylinders 56.

Figure 3:
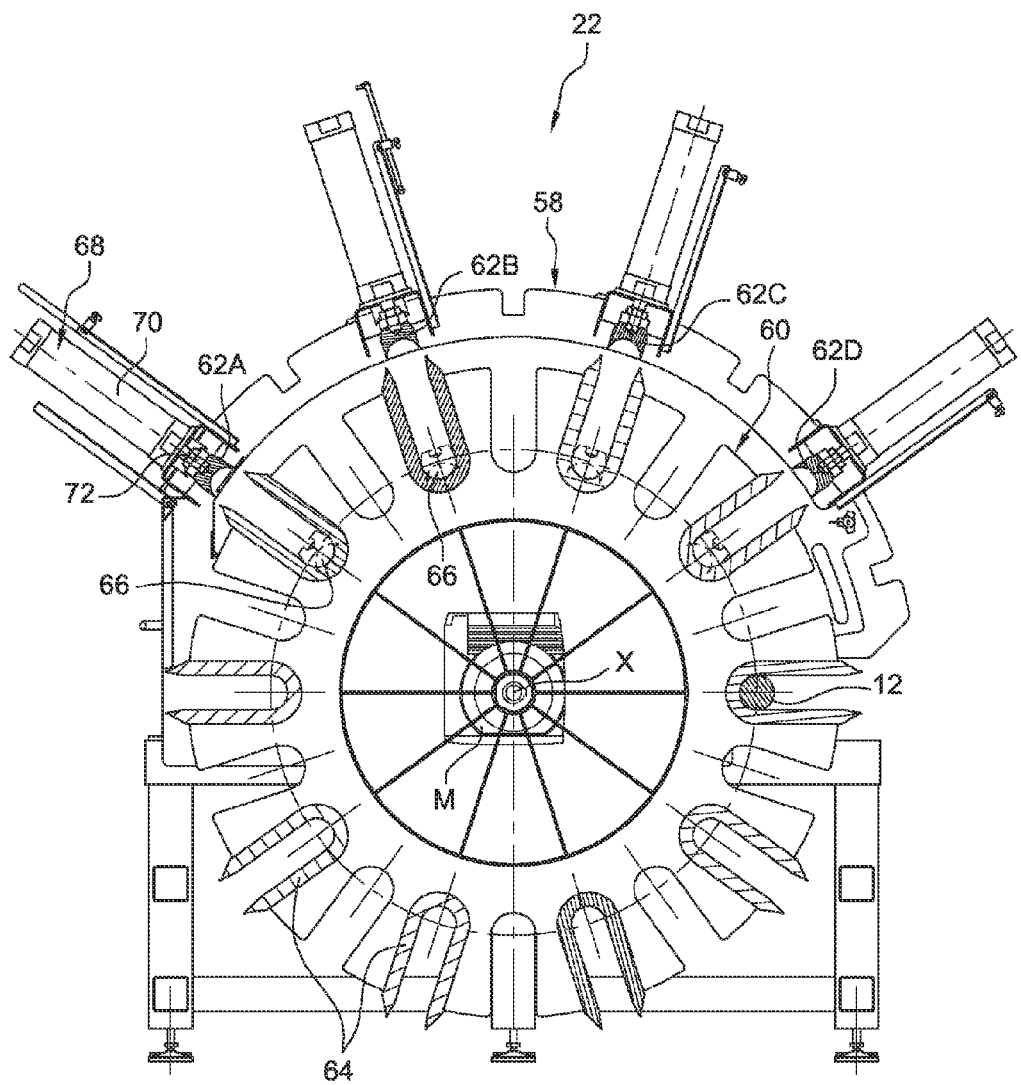
FIG. 3 is a sectional view of a device for compressing a meat article preform in the plant shown in FIG. 1.

The compression means 22 are formed by a device 22 shown in more detail in FIG. 3.

This device 22 comprises two portions that are movable relative to each other formed by a stationary portion 58 partially surrounding a movable portion forming a carousel 60. Said carousel 60 is driven in rotation about an axis X by means of conventional motor means M.

The two portions 58, 60 carry complementary pressing elements. Thus, the stationary portion 58 carries four pressing pistons 62A to 62D and the carousel 50 carries a plurality of pressing anvils 64 distributed circumferentially around said carousel 60.

The pistons 62A to 62D are distributed angularly along an imaginary arc of the stationary portion 58 surrounding part of the carousel 60.

Each anvil 64 is of a general shape that, parallel to the axis X of rotation of the carousel 60, has a profile of cross section that is generally U-shaped.

Each piston 62A to 62D has a shape that is generally elongate in a direction substantially parallel to the axis X, which shape is complementary to each anvil 64, thereby defining, between the anvil 64 and the complementary piston 62A to 62D, a station 66 for compressing the preform 20. Thus, each piston 62A to 62D is intended to cooperate with the same preform 20 placed in the same anvil 64.

Each pressing piston 62A to 62D is movable between an exit position as shown in the solid lines in FIG. 3 and a position that is pushed into a corresponding anvil 64 as shown in the broken lines of FIG. 3, using means that, for example, comprise a set of three pneumatic cylinders 68, each provided with a body 70 that is fastened to the stationary portion 58 and a rod 72 connected to the piston 62A to 62D.

The cylinders 68 press each piston 62A to 62D and a corresponding anvil 64 towards each other to compress the preform they contain.

The three cylinders 68 connected to one and the same pressing piston 62A to 62D are aligned parallel to the length of said pressing piston. Preferably, the three cylinders 68 connected to one and the same pressing piston 62A to 62D are carried by a common support 74 (see FIG. 1) that is hinged to the stationary portion 58, in order to facilitate maintenance of the device 22.

The pressing pistons 62A to 62D and the pressing anvils 64 are provided with complementary surfaces for molding the preform 20.

In the example described, the pressing pistons 62A to 62D have preform molding surfaces that vary from one piston to another, while the pressing anvils 64 have substantially identical preform molding surfaces.

The molding surfaces of the pressing pistons 62A to 62D are shown diagrammatically in FIGS. 4 to 7, and they comprise elementary surfaces, each having the general shape of an angular segment of a cylinder section. Thus, the term "axis of an elementary surface" is used below to denote the axis of the cylinder section that defines this angular surface.

In FIGS. 4 to 7, an arrow indicates the travel direction of the pressing pistons 62A to 62D from their first exit position to their second position pushed into a corresponding anvil 64. In each of FIGS. 4 to 7, the preform compression station 66 is thus located on the side of the molding surface that is opposite from said arrow.

Figure 4:
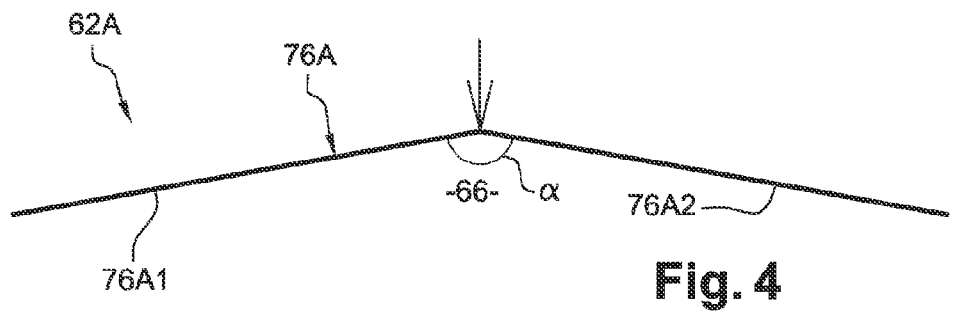
FIGS. 4 to 7 are diagrammatic views of the molding surfaces of the first to fourth pressing pistons respectively in the compression device shown in FIG. 3.

As can be seen in FIG. 4, the first pressing piston 62A comprises a first molding surface 76A comprising two elementary surfaces 76A1, 76A2 that meet longitudinally, with axes that converge going away from the preform compression station 66.

Figure 5:
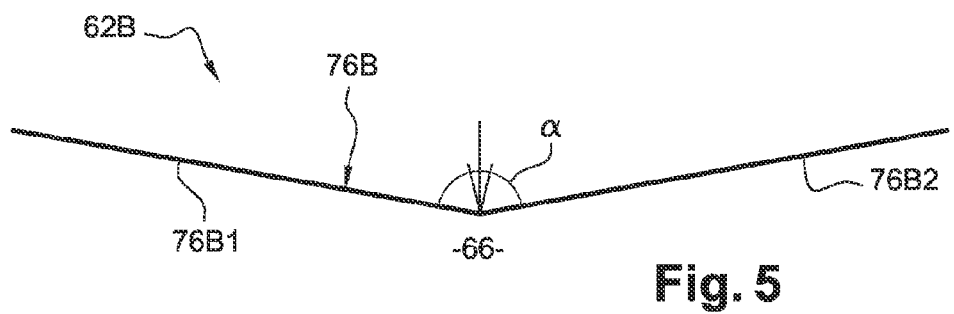

As can be seen in FIG. 5, the second pressing piston 62B comprises a second molding surface 76B comprising two elementary surfaces 76B1, 76B2 that meet longitudinally, with axes that converge going towards the preform compression station 66.

Figure 6:
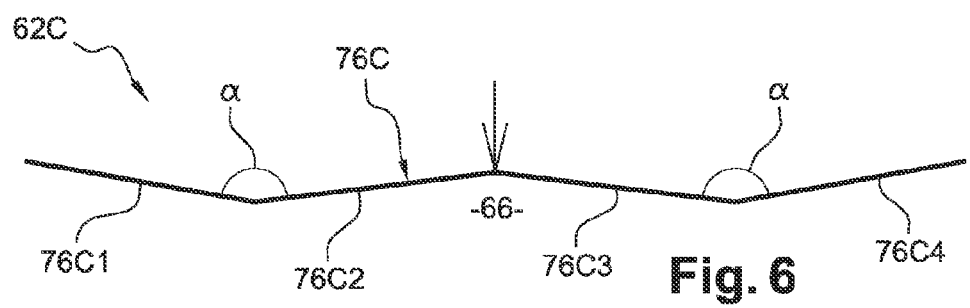

As can be seen in FIG. 6, the third pressing piston 62C comprises a third molding surface 76C comprising four elementary surfaces that meet longitudinally. The first two elementary surfaces 76C1, 76C2, considered longitudinally, have axes that converge going towards the preform compression station 66 and the last two elementary surfaces 76C3, 76C4, considered longitudinally, also have axes that converge going towards the preform compression station 66.

Preferably, the converging axes of the elementary surfaces 76A1, 76A2, 76B1, 76B2, 76C2, 76C3, 76C4 form angles $\alpha$ of about 170° between them.

Figure 7:
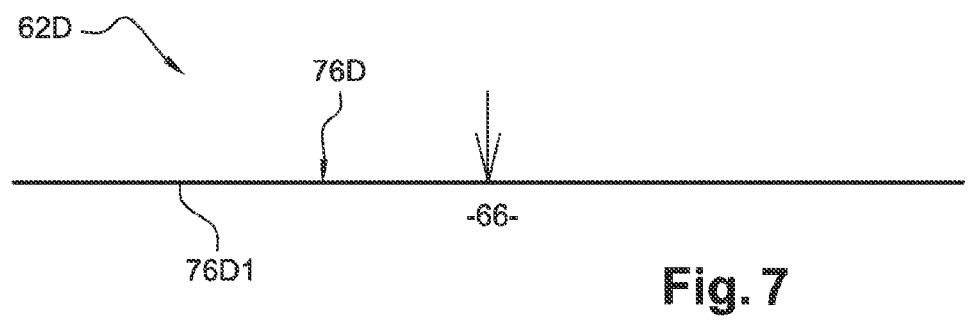

Finally, as can be seen in FIG. 7, the fourth pressing piston 62D comprises a fourth molding surface 76D comprising an elementary surface 76D1 with an axis that is substantially parallel to the elongate direction of the preform station 66.

Further, each anvil 64 has a molding surface similar to the fourth molding surface 76D of the fourth pressing piston 62D.

The plant 10 can be used to carry out a process for producing restructured meat articles 20 in accordance with the invention.

In accordance with the invention, firstly, meat pieces are destructured by fragmenting them using conventional means 14, then the resulting meat fragments are transformed into restructured meat articles 20 in the following manner.

The meat fragments are transported by the first transfer conveyor belt 24 to receptacle 26. Next, the meat fragments are entrained, via the lower compacting conveyor belt 28, to the space comprised between said conveyor belt 28 and the upper compacting conveyor belt 30.

Between the compacting conveyors 28, 30, the meat fragments undergo cohesive compaction to form a continuous block of compacted meat fragments.

It should be noted that said cohesive compaction de-aerates the block of meat without in any way causing substantial exudation of myoglobin and sarcoplasmic proteins from the meat.

The continuous block is entrained through means 18 that remove a portion of said block by slicing to form the preform 20. Thus, the preform 20 is formed by a section of the continuous block of compacted meat fragments.

It should be noted that cohesion of the meat fragments in the continuous block leaving the compacting conveyor belts 28, 30 allow this block to be sliced accurately and cleanly.

The second conveyor belt 48 then entrains the preform 20 through the means 46 in order to form said preform.

Clearly, the movements of the lower compacting conveyor belt 28 and the second transfer conveyor belt 48 are adjusted so as to correctly coordinate the steps of compacting of the meat fragments, of slicing the block of compacted meat fragments, and of passing the preform 20 through the forming means 46.

Finally, the second transfer conveyor belt 48 entrains the preform 20 to the weighing means 50. These weighing means 50 can be used to verify that the weight of the preform 20 is satisfactory, and if necessary it is adjusted by removing meat from the preform or by adding meat to said preform.

After weighing, the preform 20 is introduced, via the push rod 54, into an empty pressing anvil 64 of the compression device 22.

Next, the pressing pistons 62A to 62D cooperate in succession with the preform 20 lodged in the anvil 64 to compress it over four successive compression steps, the molding surfaces of the pressing pistons 62A to 62D varying from one step to the next.

The movements of the carousel 60 are adjusted so that the anvil 64 containing the preform 20 is presented in succession in line with the first to fourth pistons 62A to 62D.

Each compression step of the preform 20 lasts from 20 seconds to 120 seconds. The compressive pressure applied to preform 20 during each of said steps is in the range 4 bar to 15 bar, preferably in the range 4 bar to 8 bar. The compressive pressure is adjusted using conventional means and, for example, it is measured using manometers.

Next, during the first compression step, the preform 20 is compressed between the anvil 64 and the first piston 62A having a molding surface 76A that encourages the meat of the preform to move towards the longitudinal center of said preform.

Next, during the second compression step, the preform 20 is compressed between the anvil 64 and the second piston 62B having a molding surface 76B that encourages the meat of the preform 20 to move towards the longitudinal ends of said preform.

Next, during the third compression step, the preform 20 is compressed between the anvil 64 and the third piston 62C having a molding surface 76C that encourages the distribution of the meat in the preform 20 to become uniform.

Finally, during the fourth compression step, the preform 20 is compressed between the preform 64 and the fourth piston 62D having a molding surface 76D that is adapted to obtain the general cylindrical shape of the restructured meat article 12.

After compression, the restructured meat article 12 is evacuated from the anvil 64 using conventional means, for example a push rod actuated by a pneumatic cylinder.

Clearly, other shapes can be envisaged for the molding surfaces of the anvils and the pistons. Further, the number of pressing pistons may be other than four, for example reduced to three, or two, or even just one.

However, it should be noted that compression of a meat preform during at least two successive compression steps between complementary surfaces for molding the preform that vary from one step to the next is advantageous.

These two successive compression steps mean that the complementary molding surfaces of the first compression step do not necessarily conform to the final conformation of the preform and may thus have forms that encourage better distribution of the compressive stresses (and thus better control of rheology).

Following the four compression steps described above, the restructured meat article 20 may be processed (freezing, slicing, etc) or consumed like a piece of meat that has not been destructured, but that have been obtained as cuts from an animal. The compression undergone by the preform 20 produces effective mutual cohesion of the meat fibers.

However, in order to optimize the bonds between the meat fragments by encouraging exudation of myoglobin and sarcoplasmic proteins from the meat, the process may advantageously be completed by the following steps.

After compressing the preform 20, the restructured meat article 12 is placed in a flexible envelope under vacuum, preferably a plastic envelope.

Next, the envelope is closed and sealed and the closed envelope and its contents are subjected to atmospheric pressure for a certain period termed the exudation period. Preferably, the exudation period is approximately 1 hour.

Finally, the restructured meat article 12 is removed from the envelope.

While the process and product herein described constitute preferred embodiments of this invention, it is to be understood that the invention is not limited to this precise process and product, and that changes may be made therein without departing from the scope of the invention which is defined in the appended claims.

What is claimed is:

1. A process for producing a restructured meat article, the process being of the type comprising:
   destructuring at least one piece of meat by fragmenting it; and
   transforming said meat fragments into a restructured meat article;
   wherein said meat fragments are transformed into said restructured meat article by:
   forming a block of meat fragments by cohesive compaction of said meat fragments;
   removing at least a portion of said block of meat fragments, termed a preform; and
   compressing said preform during the course of at least two successive steps of compression between complementary molding surfaces of said preform;
   said compression step being achieved by a device for compressing said preform, said device comprising:
   at least one pressing anvil and at least two pressing pistons, each of said at least two pressing pistons being complementary to said at least one pressing anvil so as to define a preform compression station between said at least one pressing anvil and each of said at least two complementary pressing pistons; and
   means for pressing each of said at least two pressing pistons and said at least one pressing anvil towards each other to compress said preform between each of said at least two pressing pistons and said at least one pressing anvil,
   each of said at least two pressing pistons having a surface for molding said preform, which surface varies from one piston to another, and
   said preform contained in at least one anvil being compressed successively by said at least two pressing pistons;
   wherein said at least one pressing anvil being situated on a moveable portion and each of said at least two pressing pistons being situated in an arc on a stationary support that at least partially surrounds said moveable portion.

2. A process for producing a restructured meat article according to claim 1, in which said block of compacted meat fragments is formed continuously, said preform being constituted by a section of said continuous block.

3. A process for producing a restructured meat article according to claim 1, in which, prior to compressing said preform, said preform is weighed in order to verify that the weight of said preform is satisfactory, said weight being adjusted, where appropriate, by removing meat from said preform or by adding meat to said preform.

4. A process for producing a restructured meat article according to claim 1, in which said preform is compressed during four successive steps of compression between complementary surfaces for molding said preform, which steps vary from one step to another.

5. A process for producing a restructured meat article according to claim 1, in which each compression step lasts 20 seconds to 120 seconds, the compressive pressure applied during each of said steps being in the range 4 bar to 15 bar.

6. A process for producing a restructured meat article according to claim 1 in which, following compression of said preform:
   said compressed restructured meat article is placed in a flexible envelope, preferably formed from plastic, under vacuum;
   said flexible envelope is sealingly closed;
   said sealingly closed flexible envelope and its contents are subjected to atmospheric pressure for a period termed the exudation period; and
   the contents are removed from said flexible envelope.

7. A process for producing a restructured meat article according to claim 6, in which said exudation period is approximately one hour.

8. A device for compressing a preform for a meat article comprising:
   at least one pressing anvil and at least two pressing pistons, each of said at least two pressing pistons being complementary to said at least one pressing anvil so as to define a preform compression station between said at least one pressing anvil and said at least two complementary pressing pistons; and
   means for pressing each of said at least two pressing pistons and said at least one pressing anvil towards each other to compress said preform between said at least two pressing pistons and said at least one pressing anvil, each of said at least two pressing pistons having a surface for molding said preform, which surface varies from one piston to another, and
   said preform contained in at least one anvil being compressed successively by said at least two pressing pistons;
   wherein said at least one pressing anvil being situated on a moveable portion and each of said at least two pressing pistons being situated in an arc on a stationary support that at least partially surrounds said moveable portion.

9. A device for compressing a preform for a restructured meat article according to claim 8, comprising two portions that are movable relative to each other, respectively carrying said at least one pressing anvil and said at least two pressing pistons.

10. A device for compressing a preform for a restructured meat article according to claim 9, in which the two portions that are movable relative to each other are formed by a stationary portion at least partially surrounding a movable portion forming a carousel.

11. A device according to claim 8, to compress a preform for a restructured meat article of generally cylindrical shape, in which said at least one pressing anvil and said at least two pressing pistons include complementary molding surfaces comprising elementary surfaces, each in the general form of an angular segment of a cylinder section.

12. A device for compressing a preform for a restructured meat article according to claim 11, in which each of said at least one pressing anvil or each of said at least two pressing pistons has a molding surface selected from:
   a first molding surface comprising two elementary surfaces that meet longitudinally, with axes that converge in the direction opposite to said preform compression station;
   a second molding surface comprising two elementary surfaces that meet longitudinally, with axes that converge in the direction towards said preform compression station;
   a third molding surface comprising four elementary surfaces that meet longitudinally, said first two elementary surfaces, considered longitudinally, having axes that converge in the direction towards said preform compression station, and said last two elementary surfaces, considered longitudinally, also having axes that converge in a direction towards said preform compression station; and
   a fourth molding surface comprising an elementary surface with an axis substantially parallel to said preform compression station.

13. A device for compressing a preform for a restructured meat article according to claim 12, comprising first to fourth pistons having molding surfaces respectively formed by said first to said fourth molding surfaces, intended to cooperate in succession with one and the same preform placed in the anvil.

14. A device for compressing a preform for a restructured meat article according to claim 12, in which the anvil has a molding surface formed by the fourth molding surface.

15. A device for compressing a preform for a restructured meat article according to claim 8, comprising a plurality of anvils, each piston being intended to cooperate with one and the same preform placed in one and the same anvil.

16. A device for compressing a preform for a restructured meat article according to claim 8, in which the pressing means include, for each piston, at least one pneumatic cylinder, for example three cylinders, connected to the piston.

17. Plant for producing a restructured meat article, the plant being of the type comprising:
    means for forming meat fragments; and
    means for transforming said meat fragments into a restructured meat article;
    wherein said transformation means comprise:
    means for cohesive compaction of said meat fragments to form a block of compacted meat fragments;
    means for removing at least a portion of said block, termed the preform; and
    means for compressing the preform between complementary surfaces for molding the preform, which means for compressing the perform comprise a device as recited in claim 8.

18. Plant according to claim 17, in which the means for cohesive compaction of said meat fragments comprise a device for compacting meat fragments that comprises two conveyor belts for cohesive compaction of said meat fragments, which belts converge from upstream to downstream relative to a direction of movement of said meat fragments between said two compacting conveyor belts.

19. The plant as recited in claim 18, in which said two compacting conveyors are disposed one above the other such that the lower conveyor carries said meat fragments.

20. The plant as recited in claim 18, in which said two compacting conveyors form an angle between them that is in the range 10° to 30°.

21. Plant according to claim 17, in which the removal means comprise block-slicing means of the guillotine type.

22. Plant according to claim 21, comprising means for forming the preform, preferably forming a die of substantially rectangular section, said block-slicing means being disposed at the entrance to the means for forming the preform.

23. Plant according to claim 17, including, downstream of the means for compressing said preform, means for weighing the preform.

24. A device for compressing a preform for a meat article comprising:
    at least one pressing anvil and at least two pressing pistons, each of said at least two pressing pistons being complementary to said at least one pressing anvil so as to define a preform compression station between said at least one pressing anvil and said at least two complementary pressing pistons; and
    a driver for driving each of said at least two pressing pistons and said at least one pressing anvil towards each other to compress said preform between said at least two pressing pistons and said at least one pressing anvil, each of said at least two pressing pistons having a surface for molding said preform, which surface varies from one piston to another, and
    said preform contained in at least one anvil being compressed successively by said at least two pressing pistons;
    wherein said at least one pressing anvil being situated on a moveable portion and each of said at least two pressing pistons being situated in an arc on a stationary support that at least partially surrounds said moveable portion.

25. The device for compressing a preform for a restructured meat article according to claim 24, comprising two portions that are movable relative to each other, respectively carrying said at least one pressing anvil and said at least two pressing pistons.

26. The device for compressing a preform for a restructured meat article according to claim 25, in which the two portions that are movable relative to each other are formed by a stationary portion at least partially surrounding a movable portion forming a carousel.

27. The device according to claim 24, to compress a preform for a restructured meat article of generally cylindrical shape, in which said at least one pressing anvil and said at least two pressing pistons include complementary molding surfaces comprising elementary surfaces, each in the general form of an angular segment of a cylinder section.

28. The device for compressing a preform for a restructured meat article according to claim 27, in which each of said at least one pressing anvil or each of said at least two pressing pistons has a molding surface selected from:
    a first molding surface comprising two elementary surfaces that meet longitudinally, with axes that converge in the direction opposite to said preform compression station;
    a second molding surface comprising two elementary surfaces that meet longitudinally, with axes that converge in the direction towards said preform compression station;
    a third molding surface comprising four elementary surfaces that meet longitudinally, said first two elementary surfaces, considered longitudinally, having axes that converge in the direction towards said preform compression station, and said last two elementary surfaces, considered longitudinally, also having axes that converge in a direction towards said preform compression station; and
    a fourth molding surface comprising an elementary surface with an axis substantially parallel to said preform compression station.

29. A device for compressing a preform for a restructured meat article according to claim 24, comprising a plurality of anvils, each piston being intended to cooperate with one and the same preform placed in one and the same anvil.

30. A device for compressing a preform for a restructured meat article according to claim 24, in which the pressing driver includes, for each piston, at least one pneumatic cylinder, for example three cylinders, connected to the piston.

* * * * *